No. 891,657. PATENTED JUNE 23, 1908.
A. F. BERRY.
APPARATUS FOR THE ELECTRICAL PRODUCTION OF HEAT FOR COOKING AND OTHER PURPOSES.
APPLICATION FILED AUG. 9, 1906.

Witnesses.
Inventor.

No. 891,657.

PATENTED JUNE 23, 1908.

A. F. BERRY.

APPARATUS FOR THE ELECTRICAL PRODUCTION OF HEAT FOR COOKING AND OTHER PURPOSES.

APPLICATION FILED AUG. 9, 1906.

Witnesses.
C. P. Wright, Jr.
E. R. Peck

Inventor
A. F. Berry,
By A. S. Pattison,
Attorney.

No. 891,657.

PATENTED JUNE 23, 1908.

A. F. BERRY.
APPARATUS FOR THE ELECTRICAL PRODUCTION OF HEAT FOR COOKING AND OTHER PURPOSES.
APPLICATION FILED AUG. 9, 1906.

No. 891,657. PATENTED JUNE 23, 1908.
A. F. BERRY.
APPARATUS FOR THE ELECTRICAL PRODUCTION OF HEAT FOR COOKING AND OTHER PURPOSES.
APPLICATION FILED AUG. 9, 1906.

No. 891,657. PATENTED JUNE 23, 1908.
A. F. BERRY.
APPARATUS FOR THE ELECTRICAL PRODUCTION OF HEAT FOR COOKING AND OTHER PURPOSES.
APPLICATION FILED AUG. 9, 1906.

Witnesses
Inventor
A. F. Berry,
By A. S. Pattison
Attorney

No. 891,657. PATENTED JUNE 23, 1908.
A. F. BERRY.
APPARATUS FOR THE ELECTRICAL PRODUCTION OF HEAT FOR COOKING AND OTHER PURPOSES.
APPLICATION FILED AUG. 9, 1906.

Witnesses.
C. P. Wright
E. R. Peek

Inventor:
A. F. Berry,
By A. S. Pattison,
Attorney.

No. 891,657. PATENTED JUNE 23, 1908.
A. F. BERRY.
APPARATUS FOR THE ELECTRICAL PRODUCTION OF HEAT FOR COOKING
AND OTHER PURPOSES.
APPLICATION FILED AUG. 9, 1906.

Witnesses
Inventor
A. F. Berry,
By A. S. Pattison,
Attorney.

UNITED STATES PATENT OFFICE.

ARTHUR FRANCIS BERRY, OF EALING, ENGLAND.

APPARATUS FOR THE ELECTRICAL PRODUCTION OF HEAT FOR COOKING AND OTHER PURPOSES.

No. 891,657.   Specification of Letters Patent.   Patented June 23, 1908.

Application filed August 9, 1906. Serial No. 329,877.

*To all whom it may concern:*

Be it known that I, ARTHUR FRANCIS BERRY, a subject of the King of Great Britain and Ireland, residing at Ealing, in the county of Middlesex, England, have invented Improvements in or Relating to Apparatus for the Electrical Production of Heat for Cooking and other Purposes, of which the following is a specification.

This invention consists of improvements in that kind of electrical heating apparatus suitable for cooking and other purposes, wherein the required heat is produced by alternating current of great strength and low voltage induced in a solid secondary conductor or conductors by the action of an alternating current of comparatively small strength and high voltage, in a primary conductor or conductors, and wherein the secondary conductor, or each secondary conductor, is permanently closed upon itself, as described in the specification of another application for patent filed by me of even date herewith Serial No. 329876 so as to avoid inductive drop, irregular heating results and other disadvantages that would be liable to take place if the circuit of the secondary conductor carrying large currents of low voltage were opened and closed by a switch.

The invention has for object to prevent or minimize the inductive voltage drop in that portion (hereinafter called for distinction the current carrying portion) of the secondary conductor, or of each secondary conductor, that is outside the magnetic circuit of the core and is connected to the ends of the portion (hereinafter called for distinction the induced portion) of the secondary conductor in which the secondary current is directly induced, so that the power factor of the apparatus can be thereby increased and such apparatus constructed and worked in a more economical manner than heretofore usual.

It also has for object to enable the strength of the current generated in the secondary conductor or conductors and the heat generated in a part or parts of the current carrying portion of the secondary conductor or conductors to be readily varied, in an economical manner, to suit varying requirements, without the use of resistance or other devices that cause waste of electrical energy and without having to break and make electrical connections in circuits carrying large currents.

The invention also has for object various other improvements in apparatus of the kind referred to, as hereinafter described.

According to this invention wasteful inductive effects set up in the current carrying portion of the secondary conductor, or of each secondary conductor of electrical heating apparatus of the kind referred to, by alternating current flowing therethrough are neutralized, or nearly so, by causing alternating current to simultaneously flow in an opposite direction in an adjacent conductor either forming part of the same current carrying conductor, or of a separate current carrying conductor. For this purpose various parts of the current carrying portion of the secondary conductor, or of each secondary conductor, can be bent or so disposed relatively to each other that current will flow in opposite directions through adjacent parts so that the inductive effect of the current flowing through each part will be neutralized by the inductive effect upon such part of current flowing in an opposite direction through an adjacent part. Or the current carrying portions of two or more secondary conductors may be arranged adjacent to each other and be so connected to the induced portions of such conductors that current will flow simultaneously in opposite directions through the two adjacent current carrying portions of the conductors which may, in some cases, be connected together at one or more points with the object of effecting a balance in the strength of the currents flowing through the adjacent conductors. The current carrying portion of the secondary conductor, or each secondary conductor, is made of smaller cross sectional area at the part or parts thereof wherein it is desired to cause the current to develop heat, or the greater degree of heat, for boiling liquid or for other purpose.

To enable the degree of heat generated to be economically varied to suit different requirements the heating apparatus may be provided with two or more primary windings each wound upon a compound magnetic core common to them or upon its own magnetic core and provided with its own secondary conductor, and with circuit controlling means whereby the said primary windings can be connected in series, or in parallel, or by which one or other or two or more of them can be put out of action, at will, so that several different degrees of heat can be readily produced by the apparatus by suitably operating the controlling means. Or, the strength of the current induced in the secondary conductor or conductors and therefore the heat generated therein, can be varied to suit requirements, by shunting to a greater or less extent, the magnetic flux set up in the magnetic core by the primary conductor and which normally almost wholly passes through the said secondary conductor or conductors so as thereby, in effect, to screen the latter conductor to a greater or less extent from the magnetic influence of the core. This can be done in various ways. Conveniently it may be done by providing the core with one or more movable parts that is or are independent of or outside the secondary conductor and which can be so moved in relation to the main part of the core and the conductors thereon, as to form a magnetic shunt, by-pass or leakage circuit for the magnetic flux in parallel to that portion of the core which conveys practically the whole of the flux through the secondary conductor when the greatest heating effect is to be produced.

The magnetic core or cores can be constructed in various forms, and the primary and secondary conductors can be arranged in various ways to enable the objects of the invention to be attained, so that electrical heating apparatus embodying the present invention can be constructed in a variety of forms without departing from the essential features thereof.

In the accompanying illustrative drawings, Fig. 2 is a part plan, and Fig. 3 a horizontal section on the line B B of Fig. 1, showing one construction of electrical heating apparatus according to this invention. Fig. 4 is a side elevation, Fig. 5 a plan, and Fig. 6 a horizontal section on the line C C of Fig. 4 showing a modified construction. Fig. 17 is a side elevation and Fig. 18 a horizontal section on the line F F of Fig. 17, showing another construction.

Figure 1:
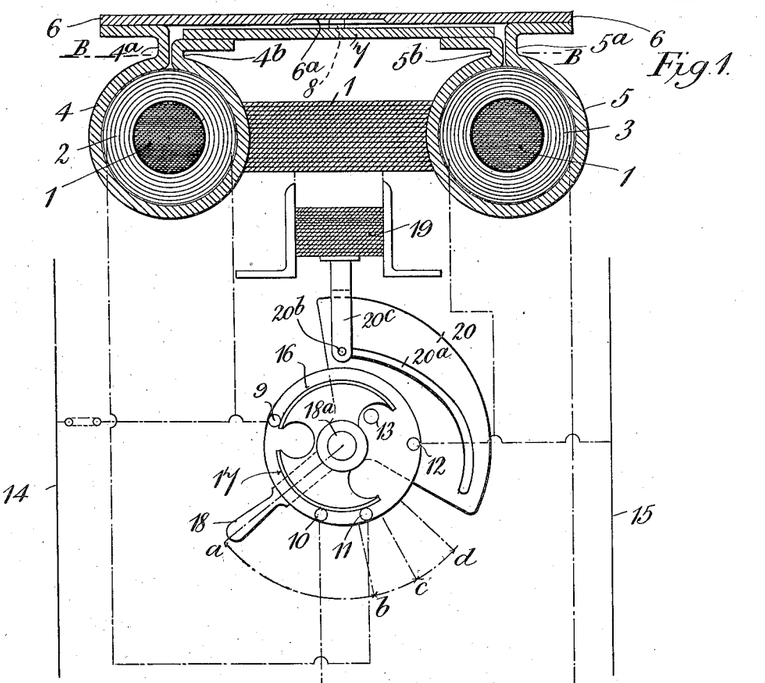
Figure 1 is a vertical section on the line A A of Fig. 3.
Figure 2:
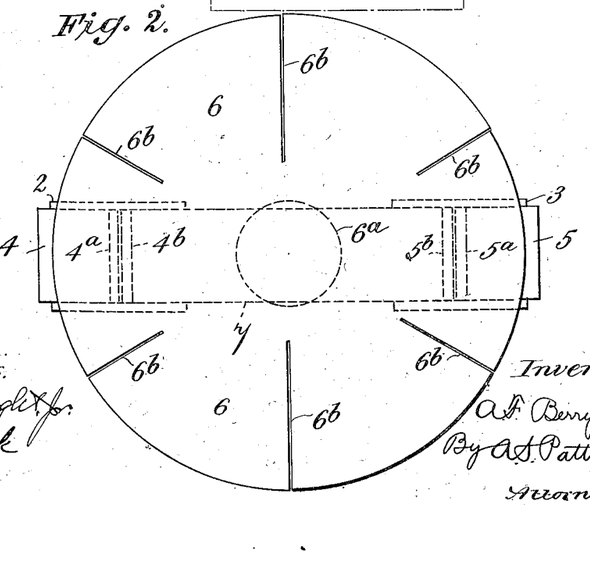
Figure 3:
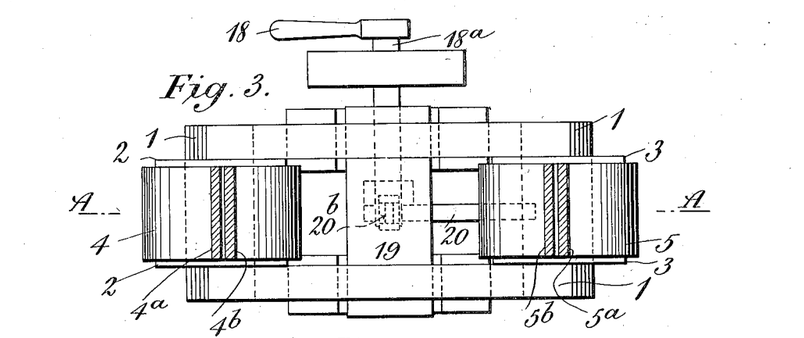

Referring to Figs. 1, 2 and 3 of the drawings, 1 is a magnetic core; 2 and 3 are primary windings thereon; 4 and 5 are the induced portions of two secondary conductors; $4^a$, $4^b$ and $5^a$, $5^b$ parts of the current carrying portions of the said conductors 4 and 5 respectively, and 6 a metal plate that is adapted to form part of the current carrying portion of the secondary conductors, or of each secondary conductor, according to circumstances, and which serves as a support for the vessel or other object to be electrically heated, or as a heat radiating or grilling surface, or as a heater to be directly applied to any article which it is desired to heat. Such a plate, which is hereinafter called for distinction the hot plate, is made of such thickness either throughout, or at a part $6^a$, or parts, thereof, as to enable any required degree of heat to be obtained by the passage therethrough of a secondary current of suitable strength. To enable the current to pass only through the desired part or parts of the hot plate, such plate has slits $6^b$ cut therein at any required part or parts thereof.

In the particular construction of electrical heating device now being described by way of example, the core 1 is of rectangular shape and the primary windings 2 and 3 are arranged on two opposite limbs thereof, the two induced portions 4 and 5 of the two secondary conductors being arranged outside the primary windings 2 and 3 respectively and each consisting of practically a single turn of metal.

One end $4^a$ of the induced portion 4 of one of the secondary conductors is connected to one portion of the hot plate 6 the diametrically opposite portion of which is connected to one end $5^a$ of the induced portion 5 of the other secondary conductor, the other ends $4^b$ and $5^b$ of the two induced portions 4 and 5 of the two conductors being connected together by a strip 7 of metal that is arranged near to and parallel, or nearly so, to the hot plate 6 from which it is suitably insulated, it may be by air, mica, or rust, the hot plate 6 and metal strip 7 forming a common current carrying portion of the two secondary conductors. The arrangement is such that current flows from the induced portion of one conductor through the hot plate 6 to one end of the induced portion of the other conductor from the second end of which it flows to the second end of the induced portion of the first conductor through the metal strip 7, the current in the hot plate and metal strip flowing in opposite but parallel directions so that the inductive effect of the alternating current flowing through one part of the current carrying portions of the secondary conductors is neutralized, or nearly so, by the same current flowing simultaneously in an opposite direction through an adjacent part of the same current carrying portion of the conductors, for the purpose hereinbefore mentioned. In some cases, in an arrangement of the kind above described, the central portions of the hot plate 6 and metal strip 7 may be electrically connected, as for example through a piece 8 of metal, that may be of high resistance, so as to form a by-path for the current from one or other secondary conductor when the other is put out of use.

The controlling device for regulating the heating effect of the apparatus, comprises stationary contacts connected to the respective ends of the several primary conductors, and movable contacts carried by a movable holder provided with a handle, the arrangement being such that in one position of the handle the primary windings will be connected in series with each other; in another position one of them will be short circuited so as to leave one only in action, and in a third position, the two windings will be connected in parallel with each other, so that, assuming there are two similar primary conductors, as in Figs. 1, 2 and 3, three degrees of heating can be easily obtained. By making the two sections of the apparatus of different heating capacity, the controlling device can be made to put either of them out of action and leave the other in action so that four degrees of heating can then be obtained. The controlling device may also be adapted to put both of the primary conductors out of action and so disconnect the apparatus from the electric supply mains; or this may be done by a separate main switch.

In the construction of switch shown diagrammatically in Fig. 1, which is suitable for use with two primary windings 2 and 3, there are four contacts 9, 10, 11 and 12 respectively and a stop 13 arranged between contacts 9 and 12. Contact 9 is connected to one of the supply conductors 14 and to one end of the primary winding 2 the other end of which is connected to contact 11. Contact 10 is connected to one end of the second winding 3 the other end of which is connected to contact 12 which is also connected to the second supply conductor 15. There are two arc shaped movable contacts 16 and 17 that are insulated from each other and mechanically connected together. The arrangement shown is such that upon moving the switch handle 18 into one position, say $a$, contact 16 bears against contact 9 and contact 17 bears against contacts 10 and 11 and places the two primary windings 2 and 3 in series with each other; when the handle is moved into a second position, $b$, contact 17 bears against contacts 10, 11 and 12 and short circuits winding 3; when moved into a third position $c$, the circuit of the short circuited winding 3 is opened, and when moved into a further position $d$ the two windings 2 and 3 are connected in parallel by reason of the contact 16 bearing against contacts 9 and 10, and contact 17 bearing against contacts 11 and 12. The reverse operations will take place when the movable contacts 16 and 17 are moved in the reverse direction. The switch however may be variously constructed for the purpose hereinbefore described.

There may be used in conjunction with the core 1, a movable bar or block 19 of laminated iron that can be moved by suitable hand operated adjusting means towards and from the opposite end members of the core that are between those upon which the primary and secondary windings 2—3 and 4—5 are placed, such bar or block serving as a magnetic shunt to shorten the magnetic circuit of the core 1 for either primary winding 2 or 3 when the other winding is put out of use.

In the example, the bar 19 is arranged to be raised and lowered by a cam 20 that is fixed on the switch spindle $18^a$ and is formed with a cam groove $20^a$ in which works a pin $20^b$ carried by a forked rod $20^c$ fixed to the bar 19. The arrangement is such that upon moving the switch lever 18 into the position $b$ to short circuit the winding 3, the cam 20 will raise the bar or block 19 into contact with the core 1, for the purpose mentioned. The bar 19 will, in the example, be also held raised when the circuit of the short circuited coil is opened, and also when the two windings are connected in parallel.

Figure 4:
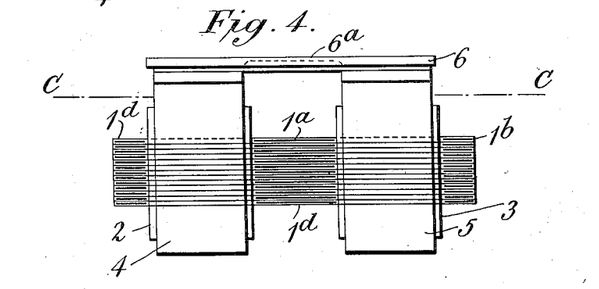
Figure 5:
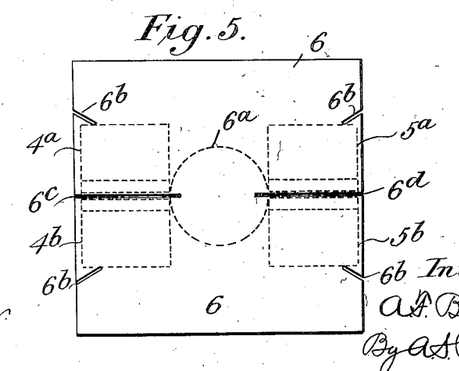
Figure 6:
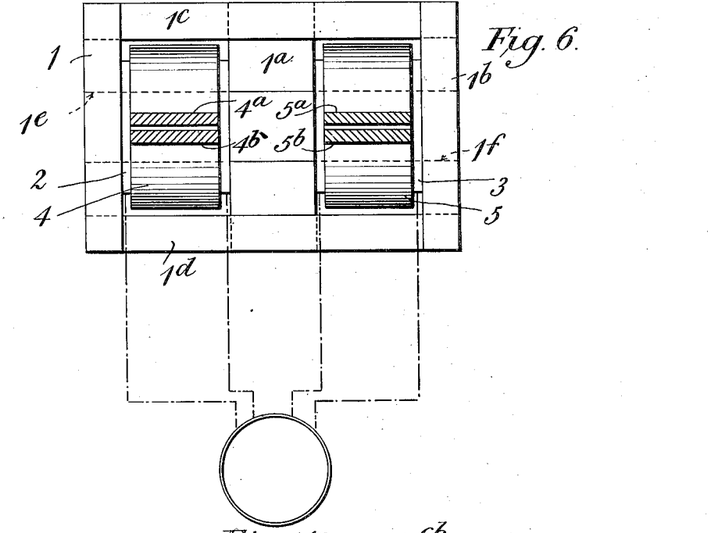

Figs. 4, 5 and 6 show another construction of apparatus according to this invention wherein the magnetic core is of rectangular shape and comprises three parallel members 1, $1^a$, $1^b$ connected together by end cross members $1^c$, $1^d$ and by two intermediate cross members $1^e$ and $1^f$ that are in line with each other and connect the two outer parallel members 1 and $1^b$ to the central parallel member $1^a$ and upon each of which one of the two sets of primary and secondary conductors 2 and 4 or 3 and 5 is wound, the core being in this case a compound one. The arrangement is such that when both primary conductors 2 and 3 are energized, the resulting magnetic flux will flow in the same direction through the two intermediate cross members $1^e$, $1^f$ and the interposed portion of the third parallel member $1^a$ and divide at the outer end of one of the intermediate cross members, say $1^e$, and flow in opposite directions through the outer and end members to the outer end of the other intermediate cross member, say 1ᶠ, where they again combine, the portions of the third parallel member 1ᵃ between the end members 1ᶜ, 1ᵈ and intermediate cross members 1ᵉ, 1ᶠ being then idle but coming into use to complete the magnetic circuit when either of the primary windings 2 or 3 is put out of use. In this example, the strips 4ᵃ 4ᵇ of the induced portion 4 of one secondary conductor are connected to the hot plate 6 at opposite sides of a slit 6ᶜ therein, and the strips 5ᵃ, 5ᵇ of the induced portion 5 of the other secondary conductor are connected to the said plate at opposite sides of a second slit 6ᵈ therein. The hot plate is formed with a central part 6ᵃ of reduced section forming part of the two secondary conductors each of which has parts extending parallel to each other so as to be traversed by current flowing in opposite directions.

Figure 7:
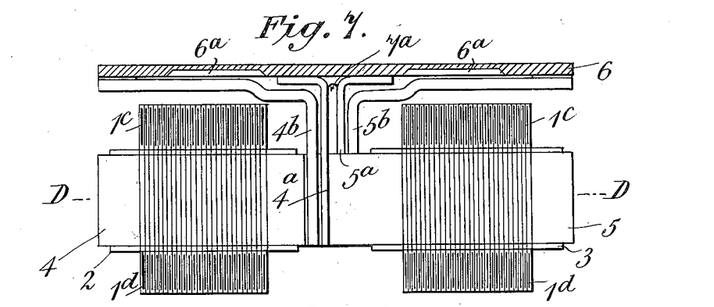
Fig. 7 is a side elevation, partly in central vertical section, Fig. 8 a part plan, and Fig. 9 a horizontal section on the line D D of Fig. 7, showing another construction of apparatus according to this invention.
Figure 8:
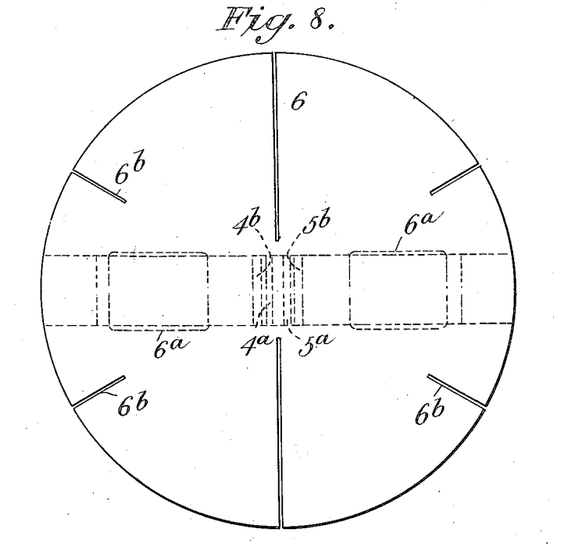
Figure 9:
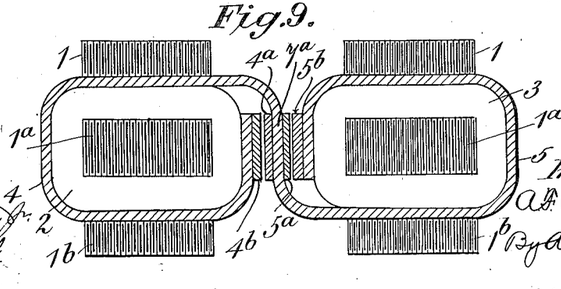

In the modified construction shown in Figs. 7, 8 and 9, there are two separate laminated magnetic cores 1 arranged adjacent to each other and each of the ordinary shell type comprising vertical side and intermediate members 1, 1ᵃ, 1ᵇ connected by top and bottom members 1ᶜ and 1ᵈ, the primary and secondary conductors 2 and 4 extending horizontally around the intermediate member 1ᵃ, of one core, and the primary and secondary conductors 3 and 5 extending horizontally around the intermediate member 1ᵃ of the other core. The induced portion 4 or 5 of each secondary conductor, which may consist of a single turn, so that the voltage induced therein will be of low value, is connected at one end, as by the strips 4ᵃ or 5ᵃ and a metal strip 7ᵃ that is common to the two conductors, to the central portion of the hot plate 6 opposite portions of which are separately connected to the other ends of the induced portions 4 and 5 of the two secondary conductors, as by other metal strips 4ᵇ and 5ᵇ that extend in opposite directions below and parallel to the hot plate and thence downward parallel to the strip 7ᵃ, so that the inductive effect of the alternating current flowing through one part of the current carrying portion of each secondary conductor is neutralized, or nearly so, by the same current flowing simultaneously in an opposite direction through an adjacent part of the same current carrying portion of the conductor. The parallel parts of each current carrying portion of each secondary conductor are insulated from each other as hereinbefore stated. The hot plate 6 may be slit at various parts 6ᵇ for the purpose hereinbefore mentioned and be made thinner at that part or those parts 6ᵃ where the electrical energy is to be converted into heat energy.

Figure 10:
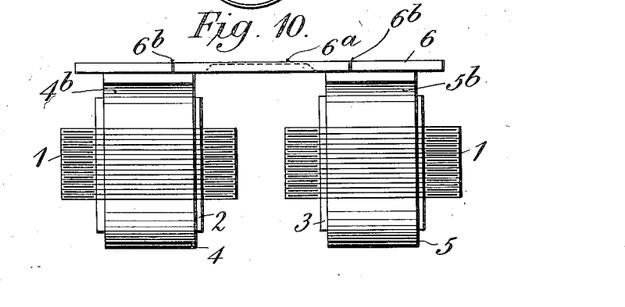
Figs. 10, 11 and 12 are similar views to Figs. 7, 8 and 9 respectively, showing a modified construction.
Figure 11:
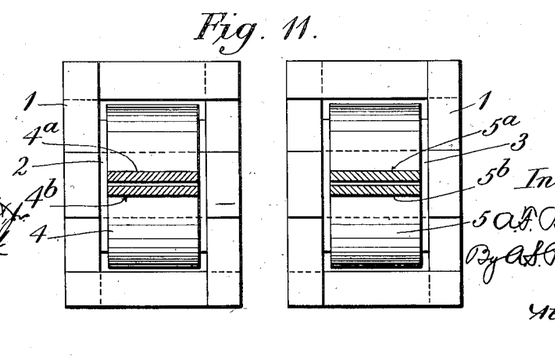
Figure 12:
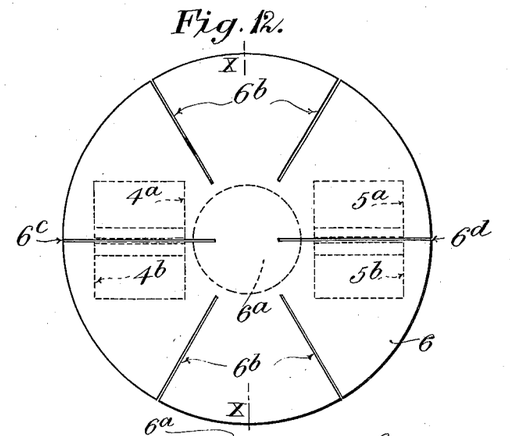

In the modified construction, shown in Figs. 10, 11, and 12, the magnetic cores 1, are arranged with their laminations horizontal so that the convolutions of the primary conductors 2 and 3 and the induced portions 4 and 5 of the secondary conductors are vertical. The two ends of the induced portion 4 of one secondary conductor are connected by parallel metal strips 4ᵃ and 4ᵇ to the hot plate 6 at opposite sides of an open ended vertical slit 6ᶜ therein extending from its periphery towards its central portion 6ᵃ which is not slit and is reduced in thickness for the purpose hereinbefore mentioned. The two ends of the induced portion 5 of the other secondary winding are similarly connected by metal strips 5ᵃ, 5ᵇ to the hot plate 6 at opposite sides of another vertical slit 6ᵈ which extends from an opposite part of the plate towards the uncut central portion 6ᵃ thereof. The arrangement is such that the current induced in each secondary conductor is caused to flow through the portion of the hot plate 6 at one side of one of the slits 6ᶜ or 6ᵈ therein towards the center thereof and returns through the portion of the plate at the opposite side of the slit and heat the thinner central portion 6ᵃ of the plate.

In each of the arrangements shown in Figs. 7 to 12, the current carrying portions of the two secondary conductors are connected together at one point, namely at the central portion 6ᵃ of the plate 6, so that a balance of the currents flowing through the two secondary conductors is effected. The hot plate 6 may however be divided into two separate parts at the line x, x, (Fig. 12) so that the secondary conductors are quite separate from each other, the separate parts of the plate being near together and being slit or slotted as at 6ᵇ, in any desired way to obtain the heating of any desired part or parts thereof.

Figure 13:
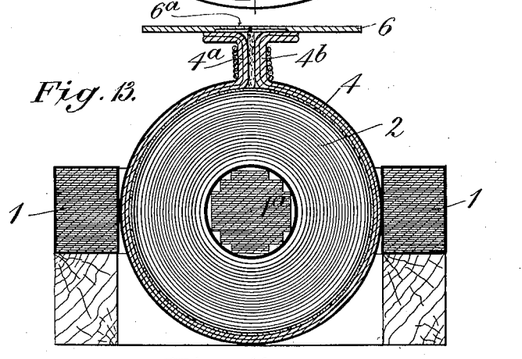
Fig. 13 is a vertical section on the line E E of Fig. 14.
Figure 14:
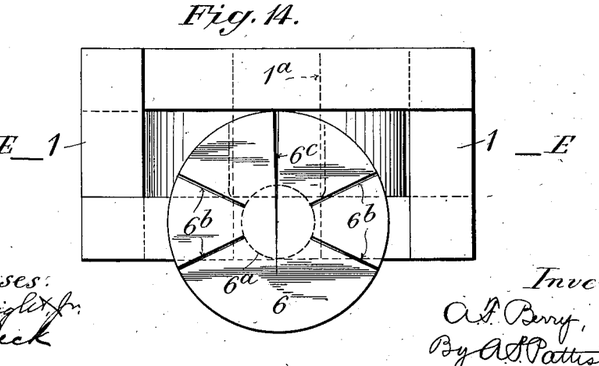
Fig. 14 is a plan showing another construction of the apparatus.

Figs. 13 and 14 show an arrangement of electrical heating apparatus according to this invention, in which the magnetic core 1 is provided with a single secondary conductor, the induced portion 4 of which is traversed by a magnetic core 1 of the shell type which also traverses the primary winding 2. The ends of the induced portion 4 of the secondary conductor are connected to two metal strips 4ᵃ, 4ᵇ that are arranged side by side and are electrically connected to a hot plate 6. In this plate is a diametrically arranged slit 6ᶜ that extends only partly across the plate from the side thereof to which the strips 4ᵃ, 4ᵇ are secured so as to leave the diametrically opposite part of the plate intact. Those parts of the plate that are at opposite sides of the slit 6ᶜ and form the central portion of the plate are recessed at 6ᵃ, so as to make such parts thinner and therefore of less cross sectional area than the remaining portion of the plate which is formed with additional vertical slits 6ᵇ that extend inward for a suitable distance from the outer periphery of the plate for the purpose hereinbefore stated. The arrangement is such that the two strips $4^a$, $4^b$ and slotted plate 6 form the current carrying portion of the secondary conductor, the current produced at any moment in the induced portion of such conductor flowing up one strip $4^a$ or $4^b$ and through the portion of the plate 6 at one side of the diametrical slit $6^c$ and back through the opposite portion of the plate and the other strip $4^b$ or $4^a$ so that it flows in opposite directions through these parts of the current carrying portion of the conductor, and, by reason of the outer slits $6^b$, is caused to flow through the thinner central portions $6^a$ of the plate which are thereby heated to a high temperature.

Figure 15:
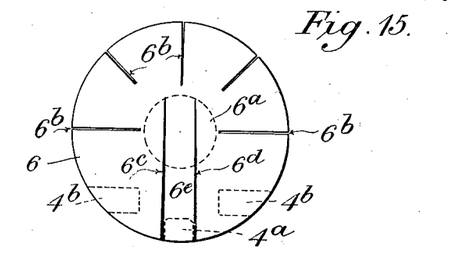
Fig. 15 is a plan showing a modification.

In the modified construction shown in Fig. 15, the hot plate 6 has two parallel vertical slots $6^c$ $6^d$ therein that extend across the greater part of the plate from one side thereof so as to form a central strip $6^e$ of metal that is connected at its free end to the vertical strip $4^a$ connected to one end of the induced portion 4 of the secondary conductor and at the other end is connected to the two parts of the plate that are at opposite sides of it and which are connected at their opposite ends to the bifurcated ends of the other strip $4^b$, the arrangement being such that current will flow in the one direction through the central portion $6^e$ of the plate 6 and in an opposite direction in the two adjacent side portions of the plate. The outer portion of the plate 6 is formed with inwardly extending slits $6^b$ to cause the current to flow through the central portions $6^a$ of the slotted plate which may, as shown, be reduced in cross sectional area as in the other arrangement hereinbefore described.

Figure 16:
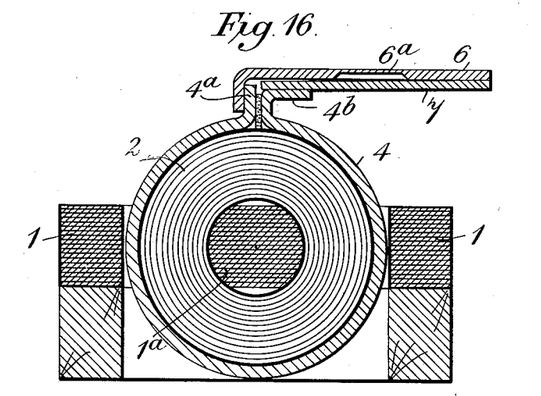
Fig. 16 is a similar view to Fig. 13 showing a further modified construction.

In the modified construction shown in Fig. 16, the apparatus comprises two plates 6 and 7 arranged one above the other and insulated from one another, as by enamel, for the greater portion of their area, but connected together at one side and at their opposite side to the two strips $4^a$, $4^b$ connected to the induced portion 4 of the secondary conductor which may, as shown, be arranged as in the example shown in Fig. 13. The two plates 6 and 7 are formed with inwardly extending slits as in the other examples, those in one plate being preferably out of register with those in the other plate, and the central portion $6^a$ of the upper or outer plate 6 being made thinner so as to be of less cross sectional area than the remainder of the plate for the purpose hereinbefore mentioned. In this case the alternating current set up in the induced portion 4 of the secondary conductor flows by one strip $4^a$ or $4^b$ to and across one plate 6 or 7 to the opposite plate 7 or 6 through which it flows in the reverse direction to the second strip $4^b$ or $4^a$ and back to the induced portion of the conductor, the current heating the central portion $6^a$ of the outer plate 6 to a high temperature. By suitably adjusting the resistance of the plates, as by making them of different thicknesses, the upper or outer one 6 may be heated to a far greater extent than the other 7 while maintaining the inductive balance caused by the two plates being throughout their coarse in close proximity to one another.

Figure 17:
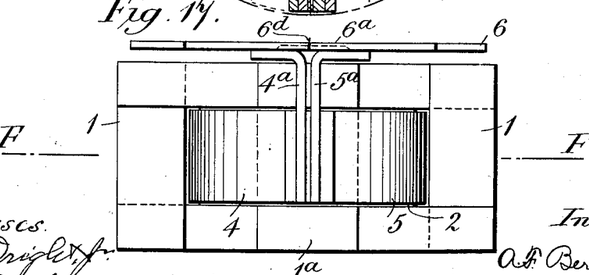
Figure 18:
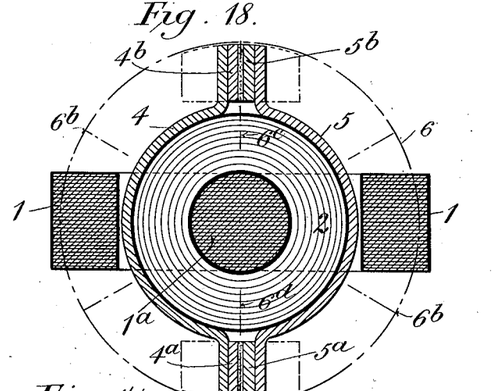

In the further modified construction shown in Figs. 17 and 18, there are two secondary conductors the induced portions 4 and 5 of which have their ends connected to two pairs of strips $4^a$, $4^b$ and $5^a$, $5^b$ connected to the two halves of a hot plate 6 that may be divided by slits $6^c$ $6^d$ extending partly or completely across it, and formed, it may be, with a central portion $6^a$ of reduced section, as before, the arrangement being such that the currents simultaneously set up in the two conductors are caused to flow in opposite directions through the current carrying portions of such conductors. The induced portion 4 or 5 of each conductor may, as shown form only about one half of a complete turn and have its ends connected to upwardly extending diametrically arranged strips $4^a$, $4^b$ and $5^a$, $5^b$, the strips connected to the induced portion 4 of one conductor being arranged adjacent to those of the induced portion 5 of the other conductor. If the slits $6^c$, $6^d$ in the plate extends only across part thereof, the two current carrying portions of the conductors will be connected together at one part, viz. the central part in the example, for the purpose hereinbefore stated.

Figure 19:
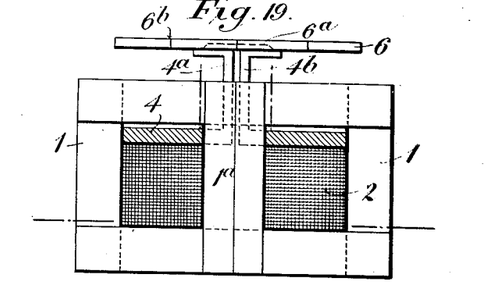
Fig. 19 is a vertical section on the line G G of Fig. 20.
Figure 20:
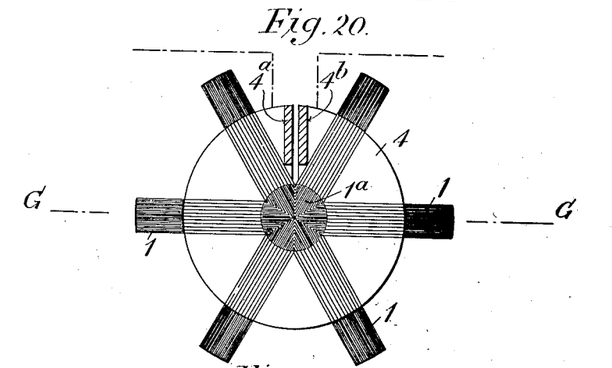
Fig. 20 is a plan, of part of another modification.

The magnetic core 1 in each of the examples shown in Figs. 13 to 18 is of the shell type comprising a central member $1^a$ around which the primary conductor 2 and secondary conductor 4 or secondary conductors 4 and 5 extend. Or the magnetic core may, as shown in Figs. 19 and 20, be composed of a number of rectangular laminated or solid iron frames or plates arranged star fashion, so as to form a central group of vertical members $1^a$ around which the primary and secondary windings extend, the induced portion 4 of the secondary conductor being at the top.

Figure 21:
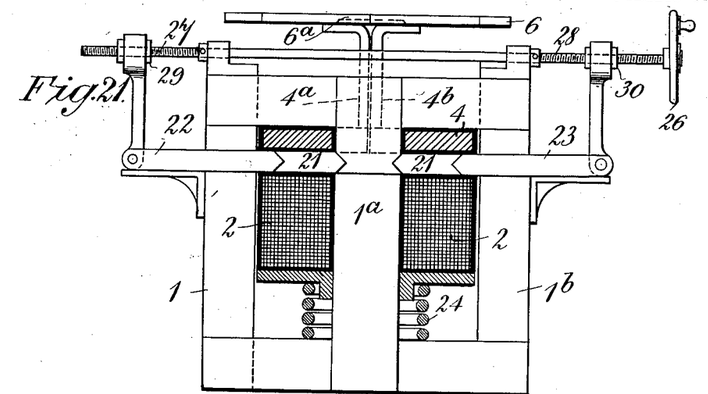
Fig. 21 shows partly in central vertical section and partly in elevation a modified construction.

Fig. 21 shows how the flux set up in a magnetic core, of shell type, by the primary winding 2 can be shunted to a greater or less extent for the purpose of varying the strength of current induced in the secondary conductor and therefore the heat generated in the hot plate 6. In this example, in or upon two of the side members 1, $1^b$ that are parallel to the central member $1^a$, and at parts thereof that are opposite the division 21 between the primary winding 2 and the induced portion 4 of the secondary conductor, are mounted two magnetic blocks or plates 22 and 23, and in connection with such blocks or plates, hand operated means are provided whereby they can be caused to move towards or from the central member 1ª and thereby shunt more or less of the magnetic flux from that part of the core that extends over and through the induced portion 4 of the secondary conductor, direct from the side members 1, 1ᵇ to the central member 1ª by a path below or outside the secondary conductor. In this way the E. M. F. of the secondary current set up in the secondary conductor can be varied without altering the position of the switch used for controlling the supply of current to the apparatus, or without altering the position of or otherwise doing anything to the secondary conductor, or to the primary conductor 2 other than, it may be, moving the latter conductor away from the secondary conductor, or vice versa, so as to form an opening or air space 21 between them to receive the magnetic blocks or plates 22 and 23. In the latter case, the primary and secondary conductors may be normally arranged near each other, the movable conductor 2 being for this purpose acted upon by a spring 24 or equivalent that will allow of its being moved downward when necessary. The blocks or plates 22 and 23 may be operated from a shaft 25 adapted to be rotated by a hand wheel 26 and formed with right and left handed screw threads 27 and 28 that are engaged with nuts 29 and 30 respectively fixed to the blocks or plates 22 and 23.

Figure 22:
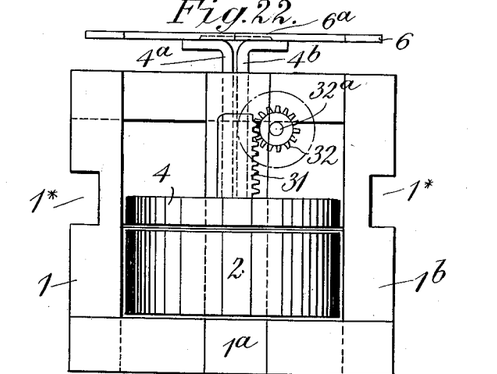
Fig. 22 is a similar view to Fig. 21 showing a modified construction.

Fig. 22 shows a modified arrangement wherein the magnetic blocks or plates 22 and 23 (Fig. 21) are dispensed with and the magnetic core, which may be of the shell type, as before, together with the primary conductor 2 thereon, is made relatively movable towards and from the portion 4 of the secondary conductor so that between the two conductors, which are normally near together, for maximum heating, an air space can be formed through which the magnetic lines can leak when it is desired to shield or screen the secondary conductor to a greater or less extent in order to reduce the current therein and consequently the heating effect thereof. For this purpose the secondary conductor may be moved vertically, as by vertical racks 31 fixed thereto and engaging pinions 32 on a hand actuated screw shaft 32ª. To increase the leakage at this time, the portions of the side members 1, 1ᵇ of the core that are normally near, or opposite to, or just above the induced portion 4 of the secondary conductor, may be reduced in cross section, as shown at 1*, so that when the core with primary conductor 2 is moved endwise in one direction, say downwards, or, as in the example, the induced portion 4 of the secondary conductor is moved in the opposite direction, to form an air space between the said conductors, the choking action of the reduced portions 1* of the iron circuit will tend to increase the leakage or shunting of the magnetic lines through the said air space.

Figure 23:
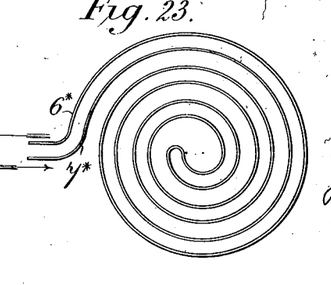
Fig. 23 is a detail view showing a modification.

The plate 6, or plates 6 and 7 forming part of the current carrying portion of the secondary conductor or conductors may be of other shapes than circular and be slit or slotted in various ways to direct the current to any derired part or parts thereof. Also, the current carrying portion of the secondary conductor, or each secondary conductor, may be in various other forms. For example, it may, as shown in Fig. 23, be bent into the form of two flat spirals 6ˣ, 7ˣ electrically connected together at their inner ends so that the current will flow through one towards the center and back through the other from the center.

Figure 24:
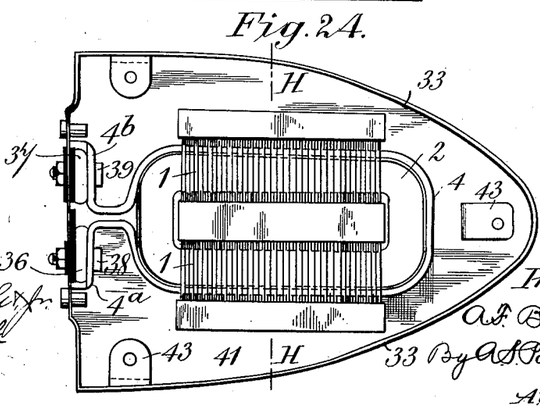
Figs. 24, 25 and 26 show apparatus according to this invention adapted for use as a sad iron, Fig. 24 being a plan with the cover removed, Fig. 25 a side elevation with the casing in vertical section and Fig. 26 a cross section on the line II II of Fig. 24.
Figure 25:
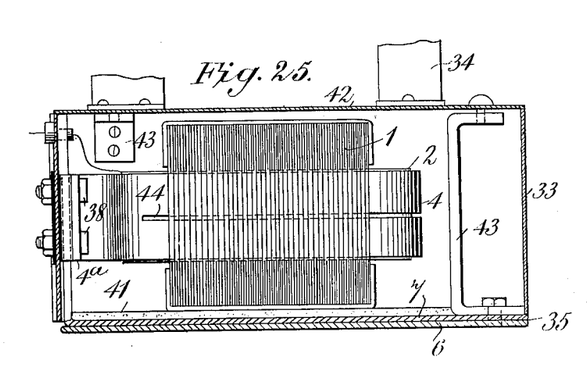
Figure 26:
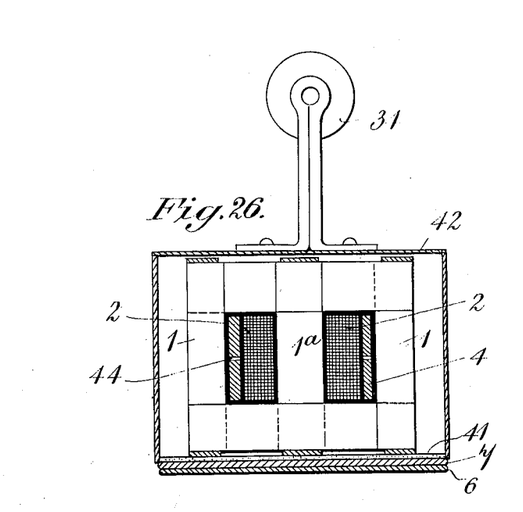

Apparatus constructed as hereinbefore described can be adapted for various purposes. Thus, the hot plate 6 may, as in the examples hereinbefore described, be arranged horizontally above the magnetic core or cores, or compound core, and be adapted to serve as a support for a kettle or other vessel to contain liquid to be heated; or it may be adapted to serve as a grilling device; or it may be arranged vertically or inclined and be adapted to serve as a heat radiator for warming rooms. Or the said plate 6 may, as shown in Figs. 24, 25 and 26, be arranged at the bottom of the apparatus and be adapted for use as a sad iron, the core 1, which is of the shell type, with the primary winding 2 and the induced portion 4 of the secondary conductor, being uppermost and inclosed in a casing 33 provided with a handle 34. In the example, there is a plate 7 arranged above and electrically connected at one end at 35 to the plate 6, the opposite ends of the two plates 6 and 7 being provided with upwardly extending lugs 36 and 37 respectively by which they are connected to the strips 4ª, 4ᵇ respectively of the induced portion 4 of the secondary conductor by bolts 38 and 39 that are insulated from the casing 33.

41 is a sheet of material, such as asbestos, to prevent or retard transmission of heat from the plates 6 and 7 to the core 1 and primary winding 2. The casing 33 is provided with a removable cover 42 secured to brackets 43 fixed to the casing 33 and plate 7.

The induced portion 4 of the secondary conductor, may, when made wide, be slit, as indicated at 44 in Fig. 25, to prevent eddy currents being set up in adjacent parts thereof.

The details of construction can be variously modified.

What I claim is:—

1. Electrical heating apparatus comprising current carrying portions of secondary conductor arranged in inductive relation to each other and means for causing alternating current to flow simultaneously in opposite directions through said portions of conductor.

2. Electrical heating apparatus having secondary current carrying portions of conductor arranged near together and so as to be traversed by alternating current flowing simultaneously in opposite directions when the apparatus is in use.

3. Electrical heating apparatus having two portions of secondary conductor arranged in close proximity to each other and so as to be simultaneously traversed by alternating current flowing in opposite directions therethrough when the apparatus is in use.

4. Electrical heating apparatus having a secondary conductor a portion of which outside the portion in which current is induced but connected thereto is bent back on itself so as to form two portions of conductor arranged near together and through which current will flow simultaneously in opposite directions when the apparatus is in use.

5. In electrical heating apparatus, a secondary conductor comprising a portion in which current is directly induced, and a current carrying portion extending alternately in opposite directions so as to form two connected parts arranged in inductive relation to each other.

6. In electrical heating apparatus, a secondary conductor comprising a portion in which current is directly induced, and a current carrying portion extending alternately in opposite directions so as to form two connected parts arranged in inductive relation to each other, one or more parts of said current carrying portion of conductor being of less section than other parts for the purpose specified.

7. In electrical heating apparatus, a secondary conductor comprising a portion in which current is directly induced, and a current carrying portion, the latter portion comprising two lengths of conductor arranged in inductive relation to each other and connected together at one end and at the other end to the respective ends of the induced portion of conductor.

8. In electrical heating apparatus, a secondary conductor permanently closed on itself and comprising a portion in which alternating current is induced and a current carrying portion, and means for neutralizing the inductive action of the current upon itself while flowing through said current carrying portion of conductor.

9. In electrical heating apparatus, a low voltage secondary conductor consisting of a single turn of metal permanently closed on itself, means for inducing an alternating current to flow through said closed conductor, and means for neutralizing the inductive action of the current flowing through the part of said conductor in which current is not induced.

10. In electrical heating apparatus, secondary current carrying portions of conductor arranged in close proximity and inductive relation to each other, and means for causing alternating current to flow simultaneously through the said portions of conductor in opposite directions.

11. Electrical heating apparatus comprising a hot plate arranged to form part of a closed secondary electric circuit, a magnetic core upon which another portion of said circuit is mounted, and means for magnetizing said core and inducing current to flow through said secondary circuit and plate.

12. Electrical heating apparatus comprising a hot plate arranged to form part of a closed secondary circuit, means for inducing current to flow through said circuit and plate, and means for neutralizing the inductive action upon itself of the current flowing through said plate.

13. Electrical heating apparatus comprising a hot plate arranged to form part of a closed secondary circuit, and means for inducing current to flow through said circuit and plate, said hot plate being slit for the purpose set forth.

14. Electrical heating apparatus comprising a hot plate arranged to form part of a closed secondary circuit, a magnetic core upon which another portion of said secondary circuit is wound, and a primary winding wound on said core for inducing current to flow through said secondary circuit and plate, said hot plate being arranged about but out of contact with said core and adapted to have heat generated therein by the passage of the secondary current therethrough.

15. Electrical heating apparatus comprising a hot plate arranged to form part of a closed secondary circuit, and means for inducing current to flow through said circuit and plate, said hot plate being of reduced section at one or more parts thereof.

16. Electrical heating apparatus comprising a permanently closed low voltage secondary circuit having an induced portion and a current carrying portion, the latter portion having parts thereof arranged adjacent to each other and so that current will flow simultaneously in opposite directions through them and also one or more parts of a section adapted to enable heat to be generated therein by current flowing therethrough, and means for inducing current to flow through said secondary circuit.

17. In electrical heating apparatus, a permanently closed low voltage secondary circuit portions of which are arranged parallel with each other and near together and one of which is adapted to have heat generated therein by the passage of current therethrough, and means for inducing alternating current in said circuit.

18. In electrical heating apparatus, a permanently closed low voltage secondary circuit portions of which are arranged parallel with each other and near together and one of which is adapted to have heat generated therein by the passage of current therethrough, and means for inducing alternating current in different parts of said circuit.

19. In electrical heating apparatus, a permanently closed low voltage secondary circuit portions of which are arranged parallel with each other and near together and one of which is adapted to have heat generated therein by the passage of current therethrough, means for inducing current in different parts of said circuit, and means for varying the action of the current inducing means.

20. Electrical heating apparatus comprising a magnetic core, a primary winding thereon, and a low voltage secondary conductor having an induced portion arranged in inductive relation to said primary winding and a current carrying portion extending back upon itself so as to form parallel and adjacent parts, one of said parts being adapted to have heat generated therein.

21. Electrical heating apparatus comprising a magnetic core, a primary winding thereon, and a low voltage secondary conductor having an induced portion arranged in inductive relation to said primary winding and a current carrying portion extending back upon itself so as to form parallel and adjacent parts, one of said parts being of reduced section at one or more places therein.

22. Electrical heating apparatus comprising a magnetic core, a primary winding thereon, and a low voltage secondary conductor having an induced portion arranged in inductive relation to said primary winding and a current carrying portion extending back upon itself so as to form parallel and adjacent parts, one of said parts being adapted to form a hot plate the section of which is reduced at one or more places.

23. Electrical heating apparatus comprising a permanently closed secondary conductor one part of which is arranged to form a hot plate adapted to be heated by passage of current therethrough, and another part of which is arranged parallel and near to said hot plate, and a primary winding arranged to induce current in said secondary conductor.

24. Electrical heating apparatus comprising a permanently closed secondary conductor one part of which is arranged to form a hot plate adapted to be heated by passage of current therethrough and another part of which is arranged parallel and near to said hot plate, and two primary windings arranged to induce current in different portions of said secondary conductor.

25. Electrical heating apparatus comprising a permanently closed secondary conductor one part of which is arranged to form a hot plate adapted to be heated by passage of current therethrough and another part which is arranged parallel and near to said hot plate, two primary windings arranged to induce current in different portions of said secondary conductor, and means for varying the action of said primary windings on said secondary conductor.

26. Electrical heating apparatus comprising a permanently closed secondary conductor one part of which is arranged to form a hot plate adapted to be heated by passage of current therethrough and another part of which is arranged parallel and near to said hot plate, two primary windings arranged to induce current in different portions of said secondary conductor, and means whereby one of said primary windings can be put out of effective action.

27. Electrical heating apparatus comprising two primary windings each having an induced portion of secondary conductor arranged in inductive relation thereto, and a hot plate arranged to be traversed by current produced in the induced portion of secondary conductor acted upon by each primary winding.

28. Electrical heating apparatus comprising two primary windings each having an induced portion of secondary conductor arranged in inductive relation thereto, and a hot plate connected to the induced portion of secondary conductor of each primary winding, said hot plate having a part of reduced section.

29. Electrical heating apparatus comprising two primary windings each having an induced portion of secondary conductor arranged in inductive relation thereto, and a hot plate connected to the induced portion of secondary conductor of each primary winding, said hot plate having a part of reduced section and one or more slits for the purpose specified.

30. Electrical heating apparatus comprising two induced portions of secondary conductor, a hot plate connected to and arranged to complete the circuit of each of said induced portions of secondary conductor, and means for inducing current in said induced portions of secondary conductor.

31. Electrical heating apparatus comprising two primary windings two induced portions of secondary conductor arranged in inductive relation to said primary windings, and a hot plate connected to and arranged to complete the circuit of each induced portion of secondary conductor.

32. Electrical heating apparatus comprising two primary windings, two induced portions of secondary conductor arranged in inductive relation to the respective primary windings, and two metal plates or strips connected to the induced portions of secondary conductor so as to form therewith a permanently closed secondary conductor, one of said plates or strips being adapted to form a hot plate.

33. Electrical heating apparatus comprising two primary windings, two induced portions of secondary conductor arranged in inductive relation to the respective primary windings, and two metal plates or strips connected to the induced portions of secondary conductor, so as to form therewith a permanently closed secondary conductor, one of said plates or strips being adapted to form a hot plate and connected to the second plate or strip through a resistance device.

34. Electrical heating apparatus comprising a magnetic core, two primary windings thereon, two induced portions of secondary conductor arranged on said primary windings, current carrying portions of secondary conductor arranged parallel and near together and connected to the two induced portions of secondary conductor, one of said current carrying portions being adapted to have heat generated therein by the passage of current therethrough, and a switch device whereby the action of said primary windings can be varied for the purpose set forth.

35. Electrical heating apparatus comprising a magnetic core, a primary winding thereon, a permanently closed secondary circuit having a portion thereof arranged in inductive relation to said primary winding and another portion adapted to have heat generated therein by the passage of electric current therethrough, and means adapted to act as a magnetic shunt to said core.

36. Electrical heating apparatus comprising a magnetic core, a primary winding thereon, a permanently closed secondary circuit having a portion thereof arranged in inductive relation to said primary winding and another portion adapted to have heat generated therein by the passage of electric current therethrough, and magnetic material arranged to be moved relatively to said core so as to form a magnetic shunt for said core.

37. Electrical heating apparatus comprising a magnetic core, a primary winding thereon, a permanently closed secondary circuit having a portion thereof arranged in inductive relation to said primary winding and another portion adapted to have heat generated therein by the passage of electric current therethrough, and a bar of magnetic material adapted to be moved towards said core and shorten the magnetic circuit thereof.

38. Electrical heating apparatus comprising two primary windings each wound on a magnetic core, two induced portions of secondary conductor arranged around the respective conductors, a hot plate connected to said induced portions of conductor and adapted to be heated by current flowing therethrough, and a switch device whereby one of said windings can be put out of action.

39. Electrical heating apparatus comprising two primary windings each wound on a magnetic core, two induced portions of secondary conductor arranged around the respective conductors, a hot plate connected to said induced portions of conductor and adapted to be heated by current flowing therethrough, and a switch device whereby said windings can be connected in series with each other and whereby one of them can be short circuited, then open circuited and afterwards connected in parallel with the other one.

Signed at London England this twenty-eighth day of July 1906.

ARTHUR FRANCIS BERRY.

Witnesses:
CHARLES COPS,
H. D. JAMESON.